(12) United States Patent
Reyna et al.

(10) Patent No.: US 12,104,523 B2
(45) Date of Patent: Oct. 1, 2024

(54) HIGH DENSITY MOBILE POWER UNIT AND SYSTEM

(71) Applicant: Enerset Electric Ltd., Houston, TX (US)

(72) Inventors: Frank J. Reyna, Houston, TX (US); Gilbeys E. Ahlong, Cypress, TX (US)

(73) Assignee: Enerset Electric Ltd., Houston, TX (US)

( * ) Notice: Subject to any disclaimer, the term of this patent is extended or adjusted under 35 U.S.C. 154(b) by 22 days.

(21) Appl. No.: 18/139,171

(22) Filed: Apr. 25, 2023

(65) Prior Publication Data
US 2023/0304437 A1    Sep. 28, 2023

Related U.S. Application Data

(63) Continuation-in-part of application No. 17/882,986, filed on Aug. 8, 2022, now Pat. No. 11,668,234.
(Continued)

(51) Int. Cl.
*F02B 63/04* (2006.01)
*B62D 21/02* (2006.01)
(Continued)

(52) U.S. Cl.
CPC ............ *F02B 63/048* (2013.01); *B62D 21/02* (2013.01); *B62D 63/068* (2013.01);
(Continued)

(58) Field of Classification Search
CPC ....... F02B 63/047; B62D 21/08; B62D 33/04; B62D 61/10; F02M 35/10144; H02K 7/1815
See application file for complete search history.

(56) References Cited

U.S. PATENT DOCUMENTS 3,151,881 A  * 10/1964  Walther ................. B62D 13/02
                                                                  280/423.1
3,453,443 A  *  7/1969  Stoeckly ................... F02C 6/02
                                                                       290/2
(Continued)

FOREIGN PATENT DOCUMENTS

CA         2652200 C   *  6/2011   ......... B62D 25/2054
EP         1897790 A1  *  3/2008   ............. B62D 13/04
(Continued)

*Primary Examiner* — Pedro J Cuevas
(74) *Attorney, Agent, or Firm* — PATENTFILE, LLC; Bradley C. Fach; Steven R. Kick

(57) ABSTRACT

A high density mobile power unit may include an elongated unibody frame having a frame cavity, a front end, a rear end, an elongated roof panel, a front panel, a rear panel, an elongated floor assembly having an upper side and a lower side, an elongated first side panel, and an elongated second side panel. An enclosure may be formed by the elongated roof panel, the front panel, the rear panel, the elongated floor assembly, the elongated first side panel, and the elongated second side panel. An under carriage structural lattice arrangement may be coupled to the lower side of the floor assembly from the midpoint and extending towards the front end. The under carriage structural lattice arrangement may include a first elongated lattice and a second elongated lattice, and the first elongated lattice and second elongated lattice may be substantially parallel to each other.

20 Claims, 10 Drawing Sheets

Related U.S. Application Data

(60) Provisional application No. 63/348,125, filed on Jun. 2, 2022, provisional application No. 63/322,704, filed on Mar. 23, 2022.

(51) Int. Cl.
  *B62D 63/06* (2006.01)
  *F02M 35/16* (2006.01)
  *H02K 7/116* (2006.01)
  *H02K 7/18* (2006.01)

(52) U.S. Cl.
  CPC ........... *F02B 63/042* (2013.01); *F02M 35/16* (2013.01); *H02K 7/116* (2013.01); *H02K 7/1815* (2013.01)

(56) References Cited

U.S. PATENT DOCUMENTS

| | | | | |
|---|---|---|---|---|
| 4,111,451 A | * | 9/1978 | Pinto | B62D 53/0864 |
| | | | | 280/474 |
| 4,117,342 A | * | 9/1978 | Melley, Jr. | B60P 3/00 |
| | | | | 290/1 A |
| 4,136,432 A | * | 1/1979 | Melley, Jr. | B60P 3/00 |
| | | | | 29/469 |
| 4,232,884 A | * | 11/1980 | DeWitt | B62D 53/06 |
| | | | | 280/789 |
| 4,397,474 A | * | 8/1983 | Mettetal | B62D 53/0807 |
| | | | | 280/492 |
| 4,484,758 A | * | 11/1984 | Murray | B62D 13/02 |
| | | | | 280/81.6 |
| 5,517,822 A | * | 5/1996 | Haws | F16K 11/052 |
| | | | | 122/1 R |
| 6,601,542 B2 | * | 8/2003 | Campion | F02B 63/04 |
| | | | | 290/1 R |
| 6,644,247 B2 | * | 11/2003 | Campion | H02P 9/04 |
| | | | | 290/51 |
| 6,765,304 B2 | * | 7/2004 | Baten | F02B 63/04 |
| | | | | 290/1 A |
| 6,827,033 B2 | * | 12/2004 | Ockels | B60P 3/1058 |
| | | | | 114/344 |
| 6,895,903 B2 | * | 5/2005 | Campion | F02B 63/04 |
| | | | | 290/1 A |
| 7,007,966 B2 | * | 3/2006 | Campion | B60P 3/00 |
| | | | | 60/322 |
| 7,081,682 B2 | * | 7/2006 | Campion | F02B 63/04 |
| | | | | 123/3 |
| 7,122,913 B2 | * | 10/2006 | Witten | F02B 63/04 |
| | | | | 123/3 |
| 7,798,558 B2 | * | 9/2010 | Messier | B62D 25/2054 |
| | | | | 296/184.1 |
| 8,037,966 B2 | * | 10/2011 | Errera | F01N 5/04 |
| | | | | 181/204 |
| 8,495,869 B2 | * | 7/2013 | Beissler | F01N 13/002 |
| | | | | 60/275 |
| 8,680,728 B2 | * | 3/2014 | Errera | F02B 63/04 |
| | | | | 123/3 |
| 10,030,579 B2 | * | 7/2018 | Austin | F16M 3/00 |
| 10,184,397 B2 | * | 1/2019 | Austin | F02C 6/00 |
| 10,337,402 B2 | * | 7/2019 | Austin | F16M 5/00 |
| 10,371,012 B2 | * | 8/2019 | Davis | F02B 63/047 |
| 10,411,556 B1 | * | 9/2019 | Sakaray | F02B 77/11 |
| 10,704,422 B2 | * | 7/2020 | Davis | F02B 63/047 |
| 10,704,472 B2 | * | 7/2020 | Davis | F02C 7/24 |
| 10,903,719 B2 | * | 1/2021 | Halbert | F04D 19/002 |
| 11,053,853 B2 | * | 7/2021 | Li | F01D 25/28 |
| 11,125,156 B2 | * | 9/2021 | Zhang | H02K 7/1823 |
| 11,143,000 B2 | * | 10/2021 | Li | H02K 7/1823 |
| 11,208,878 B2 | * | 12/2021 | Oehring | F02B 63/06 |
| 11,242,737 B2 | * | 2/2022 | Zhang | F01D 25/285 |
| 11,251,650 B1 | * | 2/2022 | Liu | F02B 63/047 |
| 11,365,675 B2 | * | 6/2022 | Siebert | F16M 1/00 |
| 11,434,763 B2 | * | 9/2022 | Morris | F02C 6/00 |
| 2002/0078876 A1 | * | 6/2002 | Ockels | B60P 3/1058 |
| | | | | 114/344 |
| 2003/0029390 A1 | * | 2/2003 | Campion | F02B 63/04 |
| | | | | 123/2 |
| 2003/0030246 A1 | * | 2/2003 | Campion | B60P 3/00 |
| | | | | 60/322 |
| 2003/0030279 A1 | * | 2/2003 | Campion | F02B 63/04 |
| | | | | 290/1 A |
| 2003/0030281 A1 | * | 2/2003 | Campion | H02P 9/04 |
| | | | | 290/1 R |
| 2003/0033994 A1 | * | 2/2003 | Campion | F02B 63/04 |
| | | | | 123/41.56 |
| 2004/0265198 A1 | * | 12/2004 | Biswas | F01N 13/009 |
| | | | | 423/210 |
| 2009/0243335 A1 | * | 10/2009 | Messier | B62D 53/061 |
| | | | | 296/184.1 |
| 2012/0102929 A1 | * | 5/2012 | Beissler | F01N 13/002 |
| | | | | 60/297 |
| 2015/0027712 A1 | * | 1/2015 | Vicknair | E21B 43/2607 |
| | | | | 166/305.1 |
| 2019/0044412 A1 | * | 2/2019 | Halbert | H02K 9/04 |
| 2019/0063262 A1 | * | 2/2019 | Davis | F01D 15/10 |
| 2019/0063263 A1 | * | 2/2019 | Davis | E21B 43/2607 |
| 2019/0063308 A1 | * | 2/2019 | Davis | F02B 63/047 |
| 2019/0063309 A1 | * | 2/2019 | Davis | H02K 7/116 |
| 2019/0063326 A1 | * | 2/2019 | Davis | F02C 6/00 |
| 2019/0063341 A1 | * | 2/2019 | Davis | F02D 29/06 |
| 2019/0067991 A1 | * | 2/2019 | Davis | H02K 7/1823 |
| 2021/0086851 A1 | * | 3/2021 | Zhang | F01D 25/30 |
| 2021/0087916 A1 | * | 3/2021 | Zhang | F04B 47/00 |
| 2021/0088042 A1 | * | 3/2021 | Zhang | F04B 9/02 |
| 2022/0290549 A1 | * | 9/2022 | Zhang | F04B 15/02 |
| 2022/0298906 A1 | * | 9/2022 | Zhong | F04B 49/022 |

FOREIGN PATENT DOCUMENTS

| | | | | |
|---|---|---|---|---|
| EP | | 1897790 B1 | * 3/2010 | ............ B62D 13/04 |
| WO | WO-2004098981 A1 | | * 11/2004 | ............ B62D 13/04 |

* cited by examiner

HIGH DENSITY MOBILE POWER UNIT AND SYSTEM

CROSS REFERENCE TO RELATED APPLICATIONS

This application is a continuation-in-part of U.S. Non-Provisional application Ser. No. 17/882,986, filed on Aug. 8, 2022, entitled "High Density Mobile Power Unit and System", which claims the benefit of U.S. Provisional Patent Application Ser. No. 63/322,704, filed on Mar. 23, 2022, entitled "High Density Mobile Power Unit (MPU) and System", and the benefit of U.S. Provisional Patent Application Ser. No. 63/348,125, filed on Jun. 2, 2022, entitled "High Density Mobile Power Unit and System", the entire disclosures of which are incorporated by reference herein.

FIELD OF THE INVENTION

This patent specification relates to the field of power generation. More specifically, this patent specification relates to a multi-fuel, high density mobile power generation unit and system.

BACKGROUND

Industries dependent on the structure and elemental content of a geographic location, such as the fracking industry, require the installation of heavy-duty equipment in remote, nonpermanent operations locations. Most of the industrial equipment involved in these operations requires substantial power to operate, but not all of the equipment requires a built-in power source. Such industrial equipment is designed without a built-in power source to minimize size and increase mobility, but this creates a need for a separate power source that is similarly mobile. The requirement for electrical power for the exploration and production in the oil and gas industry has been growing substantially in the past years. It is desirable to develop a solution for providing power to industrial equipment while minimizing both the footprint of geographic operations and the setup time required to begin and end such operations.

However, as of now, most of the solutions available involve gas turbine generators, which require high fuel pressure, gas treatment, and they are low efficiency solutions, while also requiring a high level of complexity in their installation and operation. In other cases, the available solutions in the market involve a reciprocating gas engine or dual fuel engines, which power no more than 2.5 megawatt (MW) requiring many units to achieve the required power at site, i.e., for a fracking application.

Therefore, a need exists for novel multi-fuel, high density mobile power generation units and systems.

BRIEF SUMMARY OF THE INVENTION

A high density mobile power unit and system is provided. Preferably, a High Density Mobile Power Unit (MPU) may be configured to run on natural gas, or hydrogen (or a mix of both as fuel), with a high-density power, preferably in an enclosure configured as a towable trailer using a reciprocating engine of 1200 to 1500 RPM rated engine speed. The target power of the MPU may be over 3.3 MW (gross power capacity). The gross rating or power capacity of the MPU is measured by the NOMINAL VALUE of the generator (s) rating, burning Natural pipeline quality Gas below 3000 ft, at below at 100° F. A MPU may be configured to be electrically efficient between 40% and 45% energy efficient (measured using the bhp output of the engine without parasitic loads), which significantly reduces the fuel consumption and the amount of harmful emissions. A high density mobile power system may include one or more High Density Mobile Power Units and each one of them may be connected to a Power Distribution Unit.

In some embodiments, a high density mobile power unit may include an elongated unibody frame having a midpoint, a front end, a rear end, an elongated roof panel, a front panel, a rear panel, an elongated floor assembly having an upper side and a lower side, an elongated first side panel, and an elongated second side panel, and the elongated unibody frame may provide dynamic and static rigidity to the mobile power unit. An enclosure may be formed by the elongated roof panel, the front panel, the rear panel, the elongated floor assembly, the elongated first side panel, and the elongated second side panel. The elongated roof panel, the front panel, the rear panel, the elongated first side panel, and the elongated second side panel may be coupled to the upper side of the floor assembly. A frame cavity may be bounded by the enclosure, and the enclosure may provide sound attenuation and environmental protection for elements positioned within the frame cavity. An under carriage structural lattice arrangement may be coupled to the lower side of the floor assembly from the midpoint and extending towards the front end. The under carriage structural lattice arrangement may include a first elongated lattice and a second elongated lattice, and the first elongated lattice and second elongated lattice may be substantially parallel to each other. Optionally, the unit may include a generator positioned within the enclosure. Optionally, the unit may include an engine coupled to the generator and positioned within the enclosure, and the generator may be positioned between the engine and the rear end of the enclosure.

In some embodiments, a high density mobile power unit may include: an engine that may be operatively coupled to a generator (with or without a gearbox), wherein the engine preferably comprises a 1500 RPM or a 1200 RPM reciprocating engine, and wherein generator preferably comprises the capacity to generate over 3,300 KW; a power control section; an enclosure, wherein the special designed enclosure may comprise or may be coupled to a mobile trailer, such as which may be towed and transported by a truck, semi-truck, and the like; and a cooling system that may include one or more of a radiator, enclosure air intake, enclosure exhaust, and an enclosure ventilation.

In further embodiments, a high density mobile power unit may include an elongated unibody frame having a front end, a rear end, an elongated roof panel, a front panel, a rear panel, an elongated floor assembly having an upper side and a lower side, an elongated first side panel, and an elongated second side panel. The unit may also include a frame cavity bounded by the roof panel, front panel, rear panel, the upper side of the floor assembly, first side panel, and second side panel. A plurality of wheel and tire assemblies may be coupled to the unibody frame below the lower side of the floor assembly, and the plurality of wheel and tire assemblies may support the unibody frame above a ground surface. A radiator may be coupled to the upper side of the floor assembly and positioned within the frame cavity at the front end. At least one generator may be coupled to the upper side of the floor assembly and positioned within the frame cavity at the rear end. An engine may be coupled to the upper side of the floor assembly and positioned within the frame cavity between the at least one generator and the radiator. An under carriage structural lattice arrangement may be coupled to the lower side of the floor assembly.

In further embodiments, a high density mobile power unit may include an elongated unibody frame having a front end, a rear end, an elongated roof panel, a front panel, a rear panel, an elongated floor assembly having an upper side and a lower side, an elongated first side panel, and an elongated second side panel. The unibody frame may include a midpoint and a dolly attachment point, and the dolly attachment point may be coupled to the lower side of the floor assembly between the midpoint and the rear panel. The unit may also include a frame cavity bounded by the roof panel, front panel, rear panel, the upper side of the floor assembly, first side panel, and second side panel. A plurality of wheel and tire assemblies may be coupled to the unibody frame below the lower side of the floor assembly, and the plurality of wheel and tire assemblies may support the unibody frame above a ground surface. A radiator may be coupled to the upper side of the floor assembly and positioned within the frame cavity at the front end, the radiator having a plurality of electrical fans. At least one generator may be coupled to the upper side of the floor assembly and positioned within the frame cavity at the rear end, and the at least one generator may be configured to produce at least 3.0 MW of electricity. An engine may be coupled to the upper side of the floor assembly and positioned within the frame cavity between the at least one generator and the radiator, and the engine may be a reciprocating engine configured to operate between 1,000 RPM and 2,000 RPM. A low-profile engine exhaust silencer may be coupled to the engine and positioned within the frame cavity. An air inlet plenum may be coupled to the engine and positioned within the frame cavity, and the air inlet plenum may include a first air inlet intake port that is coupled to the first side panel and a second air inlet intake port that may be coupled to the second side panel. An under carriage structural lattice arrangement may be coupled to the lower side of the floor assembly.

In some embodiments, a high density mobile power system may include: one or more power distribution units that may be configured to operate as a power distribution station, preferably configured as a mobile and towable trailer that may be employed for transporting a Medium Voltage Switchgear, together with a Low Voltage Motor Control Center, monitor and control digital system, auxiliary power, and other auxiliary systems; and one or more high density mobile power units comprising: an engine that may be operatively coupled to a generator, wherein the engine preferably comprises a 1500 RPM or 1200 reciprocating engine, and wherein generator preferably comprises the capacity to generate over 3,300 KW and above; a power control section; an enclosure, wherein the enclosure may comprise or may be coupled to a mobile trailer, such as which may be towed and transported by a truck, semi-truck, and the like; and a cooling system that may include one or more of a radiator, enclosure air intake, enclosure exhaust, and an enclosure ventilation.

Numerous objects, features and advantages of the present invention will be readily apparent to those of ordinary skill in the art. Some example objects of the present invention are listed below.

One object of the present invention is to provide a high density mobile power unit having a power generation capacity and which is within the transit regulations has been heretofore impossible with one or more engines of the size utilized by the invention. In preferred embodiments, a high density mobile power unit may comprise a Jenbacher J624 engine because it provides the right weight, size, and power to be able to be mounted in a mobile configuration. Normally, a power plant of this size will have to be mounted in separate trailers or modules. The cooling requirement of an engine of this size is very large and only with a configuration of the radiator disclosed herein can it be achieved.

Additionally, this Jenbacher J624 engine is a lean burn engine under the EPA category of spark ignition engine. They need to be permitted by the EPA for a mobile application and Jenbacher is confident it will be warranted the EPA certification since the J624 emissions comply or surpass the EPA requirements. Basically, none of the manufacturers of generators of this size has sought such certification because they believed it impossible to develop a mobile design. This is further evidence of the novelty and non-obviousness of the high density mobile power unit disclosed herein.

Another very important and novel object of the high density mobile power unit disclosed herein is that it requires no assembly once it is positioned at the desired location of generation. It is truly a plug and play unit. This feature is extremely important for an Oil & Gas application where speed, safety and reliability are the most important features. Heretofore, mobile power generation devices of this power generation capacity could only be implemented with two or more separate modules which must be transported separately and which require a lot of assembly and interconnection between the different modules in order to generate power, which is completely impractical and unreliable.

Another object of the present invention is to provide a high density mobile power unit with a novel overall design that has a reduced weight, up to 30%, compared to a typical power generating devices of this size and capacity.

Another object of the present invention is to provide a high density mobile power unit with one or more engine silencers which are positioned within the enclosure as opposed to existing devices which have their silencers positioned externally in the environment. The silencer requirement of an engine of this type is extremely large to be able to be installed in such a confined space. Only with the novel high density mobile power unit can the one or more silencers be positioned inside and not subjected to the environment.

BRIEF DESCRIPTION OF THE DRAWINGS

Some embodiments of the present invention are illustrated as an example and are not limited by the figures of the accompanying drawings, in which like references may indicate similar elements and in which.

DETAILED DESCRIPTION OF THE INVENTION

Figure 1:
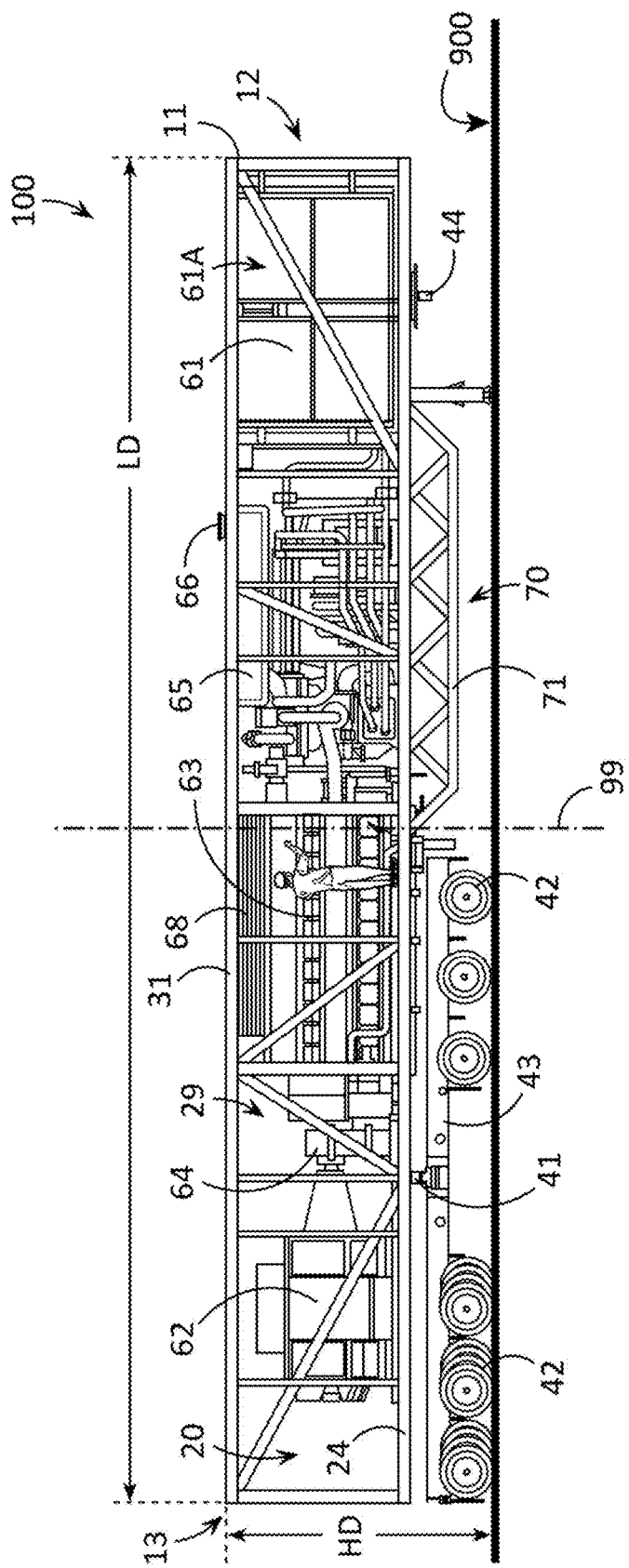
FIG. 1—FIG. 1 depicts a side elevation view of an example of a High Density Mobile Power Unit without an enclosure according to various embodiments described herein.

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

For purposes of description herein, the terms "upper," "lower," "left," "right," "rear," "front," "side," "vertical," "horizontal," and derivatives thereof shall relate to the invention as oriented in FIGS. 1-6. However, one will understand that the invention may assume various alternative orientations and step sequences, except where expressly specified to the contrary. Therefore, the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Although the terms "first," "second," etc. are used herein to describe various elements, these elements should not be limited by these terms. These terms are only used to distinguish one element from another element. For example, the first element may be designated as the second element, and the second element may be likewise designated as the first element without departing from the scope of the invention.

As used in this application, the term "about" or "approximately" refers to a range of values within plus or minus 20% of the specified number. Additionally, as used in this application, the term "substantially" means that the actual value is within 10% of the actual desired value, particularly within 5% of the actual desired value and especially within 1% of the actual desired value of any variable, element or limit set forth herein.

A new high density mobile power unit and system is discussed herein. In the following description, for purposes of explanation, numerous specific details are set forth in order to provide a thorough understanding of the present invention. It will be evident, however, to one skilled in the art that the present invention may be practiced without these specific details.

A detailed description of various embodiments is provided; however, it is to be understood that the disclosed embodiments are merely exemplary and may be embodied in various and alternative forms. The figures are not necessarily to scale; some features may be exaggerated or minimized to show details of any particular components. Therefore, specific structural and functional details disclosed herein are not to be interpreted as limiting, but merely as a representative basis for teaching one skilled in the art to variously employ the disclosed embodiments. The locations of elements shown in the figures are exemplary and it should be understood that one or more elements may be moved or repositioned without departing from the scope of the present invention.

The present disclosure is to be considered as an exemplification of the invention and is not intended to limit the invention to the specific embodiments illustrated by the figures or description below.

The present invention will now be described by example and through referencing the appended figures representing preferred and alternative embodiments. FIGS. 1-6 perhaps best illustrate examples of a high density mobile power unit ("the MPU") 100 according to various embodiments.

In some embodiments, a MPU 100 may comprise an engine 63 that may be operatively coupled to a generator 61, a power control section 20, a unibody frame 11 having a plurality of wheel and tire assemblies 42, and a radiator 61. In preferred embodiments, a MPU 100 may comprise a reciprocating engine 63 that may operate at approximately 1200 RPM to 1500 RPM and which may be operatively coupled to a generator 62 so that the generator 62 has the capacity to generate over 3,300 KW, a power control section 20, a unibody frame 11, and a cooling system that may include one or more of a radiator 61, enclosure air intake 51, and enclosure exhaust 52.

A MPU 100 may comprise an elongated unibody frame 11 which provides dynamic and static rigidity to the MPU 100. In preferred embodiments, an elongated unibody frame 11 may include a front end 12, a rear end 13, an elongated roof panel 21, a front panel 22, a rear panel 23, an elongated floor assembly 24 having an upper side 25 and a lower side 26, an elongated first side panel 27, and an elongated second side panel 28. A frame cavity 29 may be bounded and formed by the roof panel 21, front panel 22, rear panel 23, the upper side 25 of the floor assembly 24, first side panel 27, and second side panel 28. A plurality of wheel and tire assemblies 42 may be coupled to the unibody frame 11 below the lower side 26 of the floor assembly 24, and the plurality of wheel and tire assemblies 42 may support the unibody frame 11 above a ground surface 900, 900A, 900B. A radiator 61 may be coupled to the upper side 25 of the floor assembly 24 and positioned within the frame cavity 29 at the front end 12. A generator 62 may be coupled to the upper side 25 of the floor assembly 24 and positioned within the frame cavity 29 at the rear end 13. An engine 63 may be coupled to the upper side 25 of the floor assembly 24 and positioned within the frame cavity 29 between the generator 62 and the radiator 61. An under carriage structural lattice arrangement 70 may be coupled to lower side 26 of the floor assembly 24, and extending between the engine 63 and radiator 61.

Figure 4:
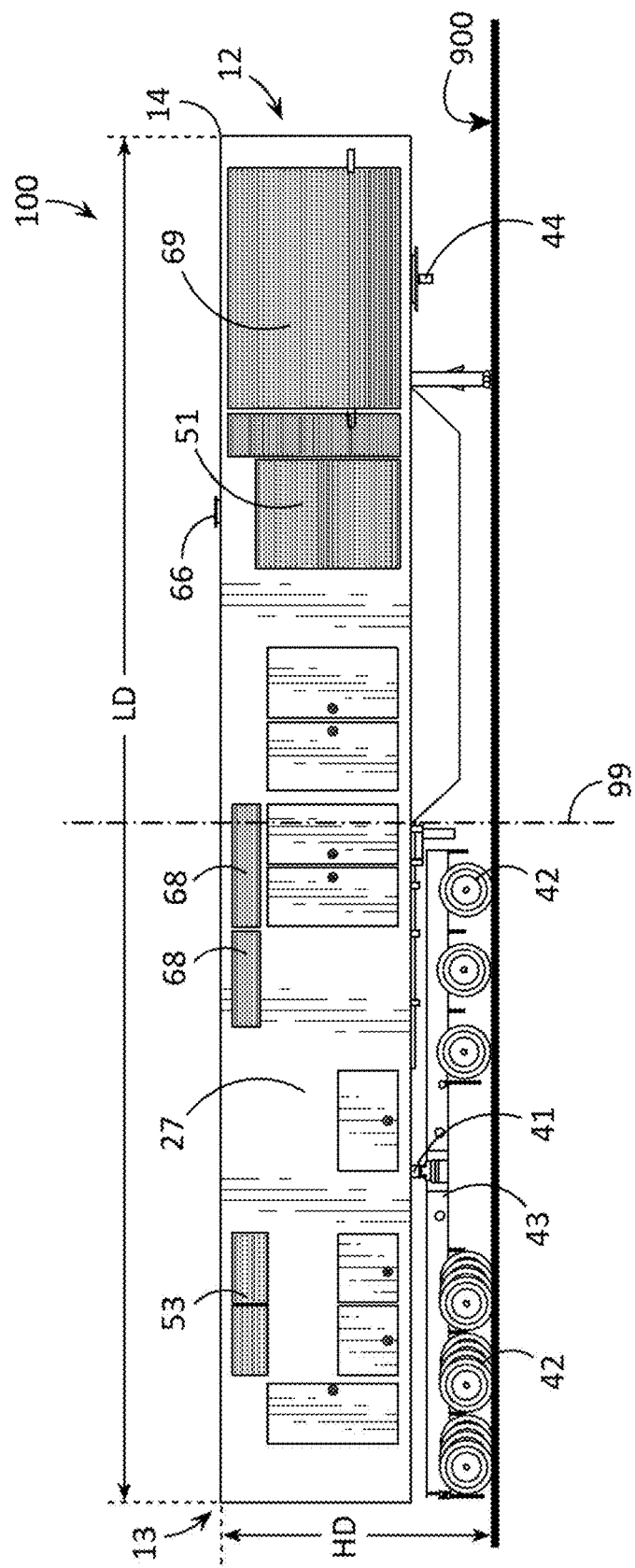
FIG. 4—FIG. 4 depicts a side elevation view of an example of a High Density Mobile Power Unit with an enclosure according to various embodiments described herein.

MPUs 100 are preferably individually mobile and are preferably able to convert between a transit mode and an operation mode. Generally, an MPU 100 may be elongated in shape by having a length dimension (LD) that describes the largest dimension of the unibody frame 11 of the MPU 100 as shown in FIGS. 1 and 4, and the length dimension (LD) of the unibody frame 11 may be elongated so as to be greater than 200 percent of the height dimension (HD) (FIGS. 1 and 4) of the unibody frame 11 and width dimension (WD) (FIG. 2) of the unibody frame 11, and more preferably greater than 500 percent of the height dimension (HD) and width dimension (WD). In preferred embodiments, an MPU 100 may comprise a midpoint 99 (FIGS. 1 and 4) which may generally describe a plane that may bisect the length dimension (LD) of the MPU 100 into two equal lengths. For example, a midpoint 99 for an MPU 100 having a length dimension (LD) of 68 feet would be 34 feet. As another example, a midpoint 99 may be halfway between the front end 12 and rear end 13.

In some embodiments, a MPU 100 may comprise a roof panel 21, a front panel 22, a rear panel 23, a first side panel 27, and a second side panel 28 which may be coupled together to the floor assembly 24 to form an enclosure 14 that may surround or enclose one or more elements of the MPU 100, such as an engine 63, generator 62, radiator 61, power control section 20, etc. The panels 21, 22, 23, 27, 28, of the enclosure 14 may be coupled together so that the enclosure 14 provides sound attenuation and environmental protection for elements of the MPU 100, such as an engine 63, generator 62, radiator 61, power control section 20, etc., that are positioned within the frame cavity 29 of the enclosure 14. An enclosure 14 may be configured in any size and shape. In preferred embodiments, the enclosure 14 may be elongated in length having a length dimension which may be at least 200 percent of its width dimension and height dimension with the roof panel 21, first side panel 27, second side panel 28, and floor assembly 24 each being elongated in shape and length so as to extend between the front end 12 and rear end 13.

A roof panel 21, a front panel 22, a rear panel 23, a first side panel 27, and a second side panel 28 may be made from aluminum, steel, or any other suitable structural material, and may preferably comprise sound deadening insulation or other acoustically dampening material(s) which may further provide sound attenuation for elements of the MPU 100, such as an engine 63, generator 62, radiator 61, power control section 20, etc., that are positioned within the frame cavity 29 of the enclosure 14. Example sound deadening insulation and other acoustically dampening materials may include: Acoustic Membrane; Acoustic Mineral Wool Cavity Insulation; Fibreglass; Resilient Channels; Acoustic Hangers (Mounts); Soundproof Drywall (Plasterboard); Dense Board (OSB, Plywood, Particle Board, Fire Board); Soundproof Floor Underlay; Anti-Vibration Soundproof Floor Mats; Acoustic Sealants; Acoustic Caulk; Acoustic Putty; Acoustic Plaster; Soundproof Spray; Soundproof Paint; Soundproof Wallpaper; Acoustic Wall Covering; Acoustic Glass (Soundproof Windows & Frames); Soundproof Doors/Frames; Door Seals, Sweeps & Gaskets; Acoustic Foam; Sound Absorber Panels; Acoustic Ceiling Systems & Tiles; Soundproof Curtains; Soundproof Blankets; Acoustic Fencing (External); Acoustic Absorber Panels (External); Industrial Acoustic Soundproof Panels; Acoustic Louvres; etc.

In preferred embodiments, a roof panel 21 and/or one or more portions of the roof panel 21 may be removable to provide access to and facilitate maintenance of the engine(s) 63, generator(s) 62, and other components within the frame cavity 29.

A MPU 100 may comprise an elongated unibody frame 11 which may include a floor assembly 24 and one or more main roof braces 31, 32, roof end braces 33, 34, central roof braces 35, vertical braces 36, angled braces 37, and horizontal braces 38 that may be coupled together to form the elongated unibody frame 11 that provides dynamic and static rigidity to the MPU 100. In some embodiments, the unibody frame 11 may comprise a floor assembly 24 which may extend from the front end 12 to the rear end 13, with the front end 12 configured to be proximate to a tractor unit or towing unit 800 (FIGS. 9 and 10) which may be used to tow and position the MPU 100. Preferably, a floor assembly 24 may comprise two parallel, elongated main floor braces 15, 16, which may be coupled together via two parallel floor end braces 17, 18, with a plurality of central floor braces 19 coupled together and coupled to the main 15, 16, and end 17, 18, braces. The elements 15-19 of the floor assembly 24 may comprise aluminum, steel, or any other suitable structural material.

In some embodiments, the unibody frame 11 may comprise two parallel, elongated main roof braces 31, 32, which may be coupled together via two parallel roof end braces 33, 34, with a plurality of central roof braces 35 coupled to and extending between the main roof braces 31, 32. The main roof braces 31, 32, roof end braces 33, 34, and central roof braces 35 may comprise aluminum, steel, or any other suitable structural material.

In some embodiments, the unibody frame 11 may comprise a first plurality of vertical braces 36 which may be coupled to both a first main roof brace 31 and a first main floor brace 15, and the unibody frame 11 may comprise a second plurality of vertical braces 36 which may be coupled to both a second main roof brace 32 and a second main floor brace 16. Preferably, the vertical braces 36 may be approximately perpendicular to the main roof braces 31, 32, and main floor braces 15, 16, that they are coupled to.

In some embodiments, the unibody frame 11 may comprise a first plurality of angled braces 37 which may be coupled to both a first main roof brace 31 and a first main floor brace 15, and the unibody frame 11 may comprise a second plurality of vertical braces 36 which may be coupled to both a second main roof brace 32 and a second main floor brace 16. Preferably, the angled braces 37 may be angled between approximately 15 to 75 degrees relative to the main roof braces 31, 32, and main floor braces 15, 16, that they are coupled to. Optionally, angled braces 37 may be coupled to one or more vertical braces 36 and/or horizontal braces 38.

In some embodiments, the unibody frame 11 may comprise one or more horizontal braces 38 which may be coupled to one or more vertical braces 36 and/or angled braces 37. Preferably, the horizontal braces 38 may be approximately perpendicular to the one or more vertical braces 36 that they are coupled to. Preferably, the horizontal braces 38 may be approximately parallel to the main floor braces 15, 16, and main roof braces 31, 32.

In some embodiments, a MPU 100 may comprise an under carriage structural lattice arrangement 70 which may be coupled to the lower side 26 of the floor assembly 24, such as to one or more central floor braces 19 and/or other elements of the floor assembly 24. In preferred embodiments, a MPU 100 may be coupled to the lower side 26 of the floor assembly 24 so that the under carriage structural lattice arrangement 70 extends between the engine 63 and radiator 61.

An under carriage structural lattice arrangement 70 may be configured in any shape and size. In some embodiments, an under carriage structural lattice arrangement 70 may comprise a first elongated lattice 71 and a second elongated lattice 75. Generally, elongated lattices 71, 75, may be elongated by having a length dimension that may be at least 200 percent greater than their width and height direction, in which the length direction is measured between the front end 12 and rear end 13 of the unibody frame 11 that they are coupled to. Preferably, the first elongated lattice 71 and second elongated lattice 72 may be substantially parallel to each other. Optionally, the first elongated lattice 71 and second elongated lattice 72 may be substantially parallel to the main floor braces 15, 16.

In preferred embodiments, a first elongated lattice 71 may comprise a first elongated major brace 72 and a plurality of first angled minor braces 73, and each first angled minor brace 73 of the plurality of first angled minor braces 73 may be coupled to both the floor assembly 24 and the first elongated major brace 72. Similarly, and in preferred embodiments, a second elongated lattice 75 may comprise a second elongated major brace 76 and a plurality of second angled minor braces 77, and each second angled minor brace 77 of the plurality of second angled minor braces 77 may be coupled to both the floor assembly 24 and the second elongated major brace 76. Generally, elongated major braces 72, 76, may be elongated by having a length dimension that may be at least 200 percent greater than their width and height direction, in which the length direction is measured between the front end 12 and rear end 13 of the unibody frame 11 that they are coupled to. Preferably, the braces 72, 73, of the first elongated lattice 71 may be coupled together in a first plane and the braces 76, 77, of the second elongated lattice 75 may also be coupled together in a second plane so that the first plane and second planes are substantially parallel to each other, and therefore the first elongated lattice 71 and second elongated lattice 72 may be substantially parallel to each other. In preferred embodiments, the first angled minor braces 73 and the second angled minor braces 77, and therefore the under carriage structural lattice arrangement 70, may be coupled to the lower side 26 of the floor assembly 24 from the midpoint 99 and extending towards the front end 12.

An MPU 100 may comprise a frame cavity 29 which may contain one or more elements, such as one or more radiators 61, generators 62, engines 63, etc. In some embodiments, an MPU 100 may comprise a roof panel 21, a front panel 22, a rear panel 23, a first side panel 27, and a second side panel 28. A roof panel 21 may be coupled to one or more of the main roof braces 31, 32, roof end braces 33, 34, and/or central roof braces 35. A front panel 22 may be coupled to a first floor end brace 17, a first roof end brace 33, and one or more vertical braces 36 proximate to the front end 12. A rear panel 23 may be coupled to a second floor end brace 18, a second roof end brace 34, and one or more vertical braces 36 proximate to the rear end 13. A first side panel 27 may be coupled to a first main roof brace 31, a first main floor brace 15, and to one or more vertical braces 36 that extend between the first main roof brace 31 and first main floor brace 15. A second side panel 28 may be coupled to a second main roof brace 32, a second main floor brace 16, and to one or more vertical braces 36 that extend between the second main roof brace 32 and second main floor brace 16. The MPU 100 may also comprise a floor panel which may cover all or a portion of the central floor braces 19 on the upper side 25 of the floor assembly 24.

Preferably, the MPU 100 may have a dolly or carriage attachment point 41 which may form a single pivot coupling point between the unibody frame 11 and a center pivoting multi-axle dolly 43. In some embodiments, the unibody frame 11 may comprise a dolly or carriage attachment point 41 which may be coupled to the lower side 26 of the floor assembly 24. In further embodiments, a dolly attachment point 41 may be coupled to the lower side 26 of the floor assembly 24 between an engine 63 and a generator 62 that are operatively coupled together in which the generator 62 is positioned proximate to the rear end 13 and rear panel 23. In further embodiments, a dolly attachment point 41 may be coupled to the lower side 26 of the floor assembly 24 between the midpoint 99 and the rear end 13, such as by being coupled to a location that is approximately 50 percent (plus or minus 10 percent) between the midpoint 99 and the rear end 13.

In preferred embodiments, a MPU 100 may comprise a plurality of wheel and tire assemblies 42 which may be coupled to the unibody frame 11 below the lower side 26 of the floor assembly 24, and the plurality of wheel and tire assemblies may support the unibody frame 11 above a ground surface 900, 900A, 900B. Preferably, a wheel and tire assembly 42 may comprise a rubber tire that may be mounted on a steel or other material wheel, although wheel and tire assemblies 42 may comprise any type of wheel, track, or other device configured for contacting and moving across a ground surface 900, 900A, 900B. In further embodiments, a MPU 100 may comprise two or more pluralities of wheel and tire assemblies 42 which may be coupled to the unibody frame 11 below the lower side 26 of the floor assembly 24. For example, a MPU 100 may comprise a first plurality of wheel and tire assemblies 42 which may be coupled to a center pivoting multi-axle dolly 43 that may be coupled to a dolly attachment point 41.

In some embodiments, a MPU 100 may comprise a center pivoting multi-axle dolly 43 that may be coupled to the dolly attachment point 41, and at least half of the plurality of wheel and tire assemblies 42 of the MPU 100 may be coupled to the center pivoting multi-axle dolly 43. A center pivoting multi-axle dolly 43 may comprise a plurality of axles 43A, as perhaps best shown in FIG. 3, such as four axles 43A, five axles 43A, six axles 43A, etc. Preferably, two or more, such as four, wheel and tire assemblies 42 may be coupled to each axle 43A. In preferred embodiments, a center pivoting multi-axle dolly 43 may comprise between four and six axles 43A with each axle 43A having four wheel and tire assemblies 42. In further embodiments, a center pivoting multi-axle dolly 43 may comprise any number of axles 43A with each axle 43A having any number of wheel and tire assemblies 42. Optionally, a center pivoting multi-axle dolly 43 may comprise one or more axles 43A which may be configured to pivot relative to one or more other axles 43A so as to be able to be steered.

Preferably, a center pivoting multi-axle dolly 43 may be pivotally coupled to the dolly attachment point 41 so that the center pivoting multi-axle dolly 43 may be configured to pivot relative to the unibody frame 11. In some embodiments, a center pivoting multi-axle dolly 43 may be coupled to the unibody frame 11 via a single dolly attachment point 41, and the center pivoting multi-axle dolly 43 provides mobility of the MPU 100 on ground surfaces having road positive slope 900A (FIG. 9) and on ground surfaces having road negative slope 900B (FIG. 10) by allowing the wheel and tire assemblies 42 to be pivoted towards and away from the rear end 13 and midpoint 99 so that the unibody frame 11 and enclosure 14 remain substantially level (plus or minus 5 degrees from level). A center pivoting multi-axle dolly 43 may pivot wheel and tire assemblies 42 towards and away from the rear end 13 and midpoint 99 so that the unibody frame 11 and enclosure 14 remain substantially level using a hydraulic leveling mechanism, a pneumatic leveling mechanism, or any other suitable leveling mechanism which may control the angle of the center pivoting multi-axle dolly 43 relative to the dolly attachment point 41, unibody frame 11, and enclosure 14.

In some embodiments, a MPU 100 may comprise a towing attachment point 44 which may be coupled to the unibody frame 11 proximate to the front end 12 and which may be coupled to the lower side 26 of the floor assembly 24. In further embodiments, a towing attachment point 44 may be coupled to the lower side 26 of the floor assembly 24 below a radiator 61 that is positioned proximate to the front end 12 and front panel 22.

In some embodiments, a MPU 100 may comprise a towing attachment point 44 which may be coupled directly or indirectly to a towing unit 800 (FIGS. 9 and 10) or vehicle, such as a tractor truck, in order to tow the MPU 100 to a desired location. Preferably, a towing attachment point 44 may be coupled on the lower side 26 of the unibody frame 11 proximate to the front end 12 and the towing attachment point 44 may be used to pivotally couple the MPU 100 to a towing vehicle.

In some embodiments, a MPU 100 may comprise a height dimension (HD) which may describe the distance between the roof panel 21 and a ground surface 900 (FIG. 1) that the wheel assemblies 42 are in contact with. In preferred embodiments, the height dimension (HD) may be less than fourteen feet. In further embodiments, the height dimension (HD) may be between twelve and eighteen feet.

A MPU 100 may comprise one or more engines 63 which may be operatively coupled to one or more generators 62 so that mechanical energy generated by the one or more engines 63 may be communicated to the one or more generators 62 in order to generate electrical energy. In preferred embodiments, an engine 63 may be operatively coupled to a generator 62 via a speed reduction gearbox 64 that uses gears and gear trains to provide speed and torque conversions from a rotating power source to another device or any other mechanical arrangement which provides controlled application of power. In further preferred embodiments, an engine 63 may be operatively coupled to a generator 62 via a speed reduction gearbox 64 that is used to reduce the input velocity of the engine 63 while increasing the torque produced by the input. A speed reduction gearbox 64 or reduction gearbox preferably has teeth on the pinions and wheels that mesh with each other to transfer power from the driver shaft to the driven shaft to reduce speed. In further preferred embodiments, a MPU 100 may comprise an engine 63 that may be coupled to a generator 62 with a speed reduction gearbox 64 so that the speed reduction gearbox 64 may be positioned in between the generator 62 and the engine 63 and so that the engine 63, speed reduction gearbox 64, and generator 62 are positioned within the enclosure 14.

In preferred embodiments, a MPU 100 may comprise one or more engines 63 and each engine 63 may be operatively coupled to one or more generators 62 with the one or more generators 62 configured to generate a target power output that is at or over 3.0 MW, and more preferably at or over 3.3 MW or any other target power output. In further preferred embodiments, the one or more engines 63 which may be operatively coupled to one or more generators 62 may be electrically efficient to over 40% and more preferably to over 45% energy efficient, which significantly reduces the fuel consumption and the amount of harmful emissions. In further embodiments, a MPU 100 may be configured to generate approximately 4.4 MW of power via a generator 62 and an engine 63 using natural gas as a fuel and having an efficiency of over 40% and more preferably to over 45%. The gross rating or power capacity of an MPU 100 preferably may be measured by the NOMINAL VALUE of the generator (s) 62 rating, burning Natural pipeline quality Gas below 3000 feet, at or below 100 degrees Fahrenheit. A MPU may be configured to be electrically efficient between 40% and 45% energy efficient (measured using the bhp output of the engine(s) 63 without parasitic loads), In some embodiments, an engine 63 may comprise a reciprocating engine that may be configured to operate between 1,000 RPM and 2,000 RPM. In further embodiments, an engine 63 may comprise a reciprocating engine that may be configured to operate between 1,100 RPM and 1,600 RPM. In preferred embodiments, an engine 63 may comprise a reciprocating engine that may be configured for operating at approximately 1200 to 1500 RPM, although other engine speeds may be used. Due to the large weight and vibrations of an engine 63, a very special design is needed (as described above) to be able to install the reciprocating engine 63 in the frame cavity 29.

An engine 63 may be configured to use one or more fuel sources, such as natural gas, or hydrogen (or a mix of both as fuel) or any other fuel source capable of powering an engine. Optionally, a MPU 100 may comprise two engines 63 which may be configured to run on different fuel sources or types. In some embodiments, a MPU 100 may comprise one or more, such as two reservoir oil tanks for used oil from the reciprocating engine 63 and another tank for replenishing oil. Preferably, the oil capacity should allow the one or more engines 63 of a MPU 100 to run at minimum for 100 hours continuously without removing or replenishing the oil in tanks. Optionally, a MPU 100 may include a fuel supply connection which may be used to provide an uninterrupted source of fuel to an engine 63. Preferably, a MPU 100 requires very low pressure for the fuel intake for its one or more engines 63.

In some embodiments, a MPU 100 may comprise one or more low-profile engine exhaust silencers 65 which may be coupled to an engine 63 and positioned within the frame cavity 29. Optionally, a low-profile engine exhaust silencer 65 may be configured as a silencer and flue gas exhaust for the engine 63 which may be located right before a radiator 61 in which the radiator 61 is positioned proximate to the front panel 22 and/or front end 12. In preferred embodiments, a low-profile engine exhaust silencer 65 may comprise an exhaust port 66 that exits through the roof panel 21. In further preferred embodiments, a MPU 100 may comprise two low-profile engine exhaust silencers 65 which may be coupled to an engine 63 and positioned within the frame cavity 29 and each low-profile engine exhaust silencer 65 may comprise an exhaust port 66 that exits through the roof panel 21.

In some embodiments, a MPU 100 may comprise one or more air inlet plenums 67 which may be coupled to an engine 63 and which may be and positioned within the frame cavity 29. An air inlet plenum 67 may function to transfer the fuel-air mixture to the cylinders of a reciprocating engine 63. An air inlet plenum 67 may comprise one or more the air inlet intake ports 68 which may be coupled to a panel 21, 22, 23, 27, 28 of the enclosure 14. Generally, an air inlet intake port 68 may comprise the aperture or orifice through which air may enter the air inlet plenum 67. In preferred embodiments, an air inlet plenum 67 may comprise one or more the air inlet intake ports 68 which may be coupled to the first side panel 27 and/or one or more inlet intake ports 68 which may be coupled to the second side panel 28. For example, an MPU 100 may comprise an air inlet plenum 67 which may be coupled to an engine 63, the air inlet plenum 67 positioned within the frame cavity 29, and the air inlet plenum 67 may comprise a first air inlet intake port 68 that is coupled to the first side panel 27 and a second air inlet intake port 68 that is coupled to the second side panel 28.

In some embodiments, a MPU 100 may comprise one or more power generators 62. A generator 62 may comprise any suitable type of electricity generator that may be capable of preferably generating between approximately 3.3 to 4.4 MWs. For example, a MPU 100 may comprise one or more power generators 62 that may be a Jenbacher J624 generator set. The J624 generator set may each be installed inside the frame cavity 29 of the enclosure 14. Optionally, the base of the J624 may be integral with the floor assembly 24. In some embodiments, and as shown in FIGS. 1-6, a generator 62 takes its cooling air directly from the outside of the enclosure 14 and discharges the hotter air via a generator exhaust and intake ports 53 in the opposite sides of the enclosure 14. As another example the MPU 100 may comprise two generators 62 that may each be Waukesha's power generator model 9504 "Enginators" (each of 1.78 MW). Two of these generators 62 may be installed in the frame cavity 29 of the MPU 100.

In some embodiments, a MPU 100 may comprise a filtered air inlet intake port 68 which may intake air for the combustion in the engine(s) 63 that may be capable of filtering the intake air for any installation or deployment when converting between transit mode and operation mode. An air inlet intake port 68 may comprise a paper, foam, cotton, stainless steel, oil bath, or any other suitable filter element.

Preferably, a MPU 100 may comprise a power control section 20, which may comprise one or more user inputs which may be used to control and visually describe the functions of the one or more elements of the MPU 100. In some embodiments, the power control section 20 connects the one or more elements of the MPU 100 by means of a circuit breaker. Optionally, a power control section 20 may be located between a generator 62 and the rear panel 23.

In some embodiments, a MPU 100 may comprise a cooling system that may include one or more of a radiator 61, enclosure air intake 51, enclosure exhaust 52, and an enclosure ventilation. The ventilation of the enclosure 14 is critical as well as the design of the cooling radiator 61. Both elements require a bespoke design to achieve the desired results which includes the flexibility to install the cooling radiator 61 in the front of frame cavity 29 of the unibody frame 11 enclosure 14 or in the back of the enclosure 14. In preferred embodiments, the power control and switchgear can be installed in a side of the frame cavity 29 that is opposite to where the radiator 61 is installed.

Generally, a radiator 61 may be positioned within the enclosure 14 and configured to conduct heat from the one or more engines 63 outside of the enclosure 14. In some embodiments, a radiator 61 may be configured as a four walls radiator having four cooling areas 61A that may be in communication with one for more radiator exhaust and intake ports 69 on the enclosure 14, and the radiator 61 may be configured to generate one or more suctioning airflows in the X and Z axis (shown by arrows 81X and 81Z in FIGS. 2, 3, and 5), while generating a discharging airflow in the Y axis (shown by arrows 82Y in FIGS. FIGS. 2, 3, and 5). In preferred embodiments, a radiator 61 may be configured as a four walls radiator having four cooling areas 61A that may each be in communication with one radiator exhaust and intake port 69 on the enclosure 14, e.g., one on each side panel 27, 28, one on the roof panel 21, and one on the front panel 22.

A four walls radiator 61 may comprise one or more, such as a plurality of, fans 60 which may be configured to motivate air through the four cooling areas and radiator exhaust and intake ports 69 on the enclosure 14. In preferred embodiments, a four walls radiator 61 may comprise a plurality of fans 60 which may be configured to generate one or more suctioning airflows in the X and Z axis (shown by arrows 81X and 81Z in FIGS. 2, 3, and 5), while generating a discharging airflow in the Y axis (shown by arrows 82Y in FIGS. 2, 3, and 5).

Figure 2:
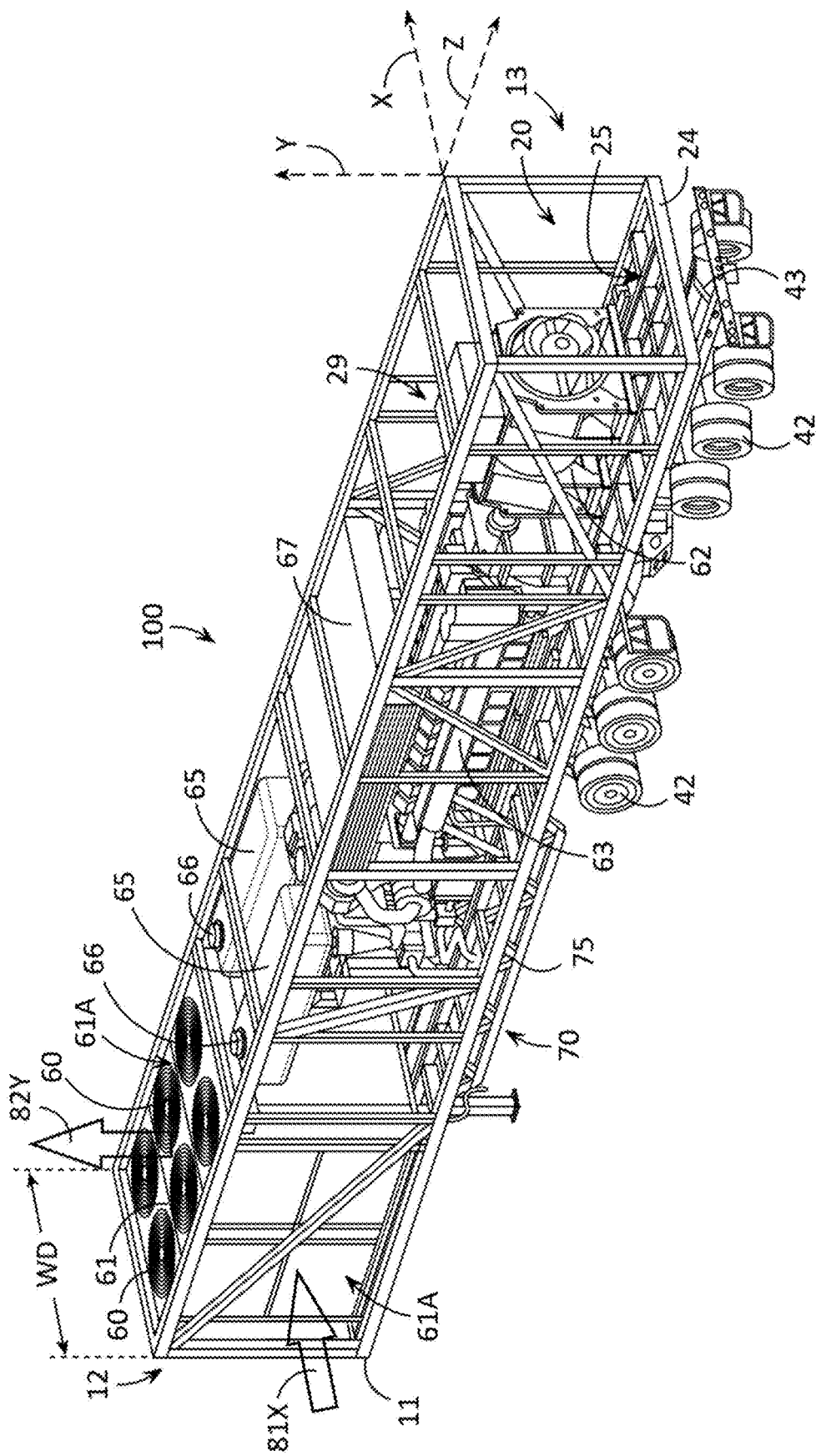
FIG. 2—FIG. 2 illustrates a top, rear perspective view of an example of a High Density Mobile Power Unit without an enclosure according to various embodiments described herein.
Figure 3:
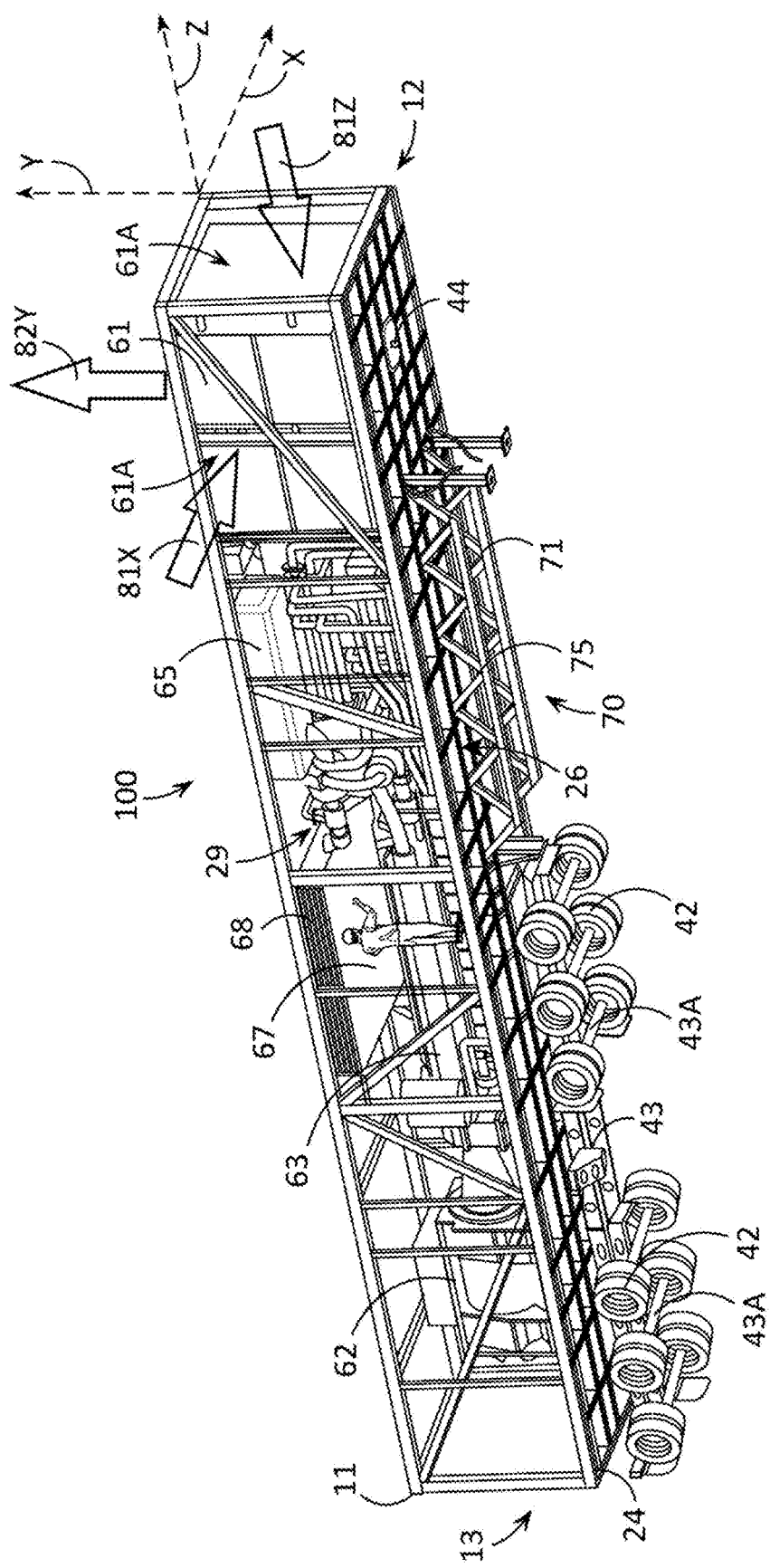
FIG. 3—FIG. 3 shows a bottom, front perspective view of an example of a High Density Mobile Power Unit without an enclosure according to various embodiments described herein.
Figure 5:
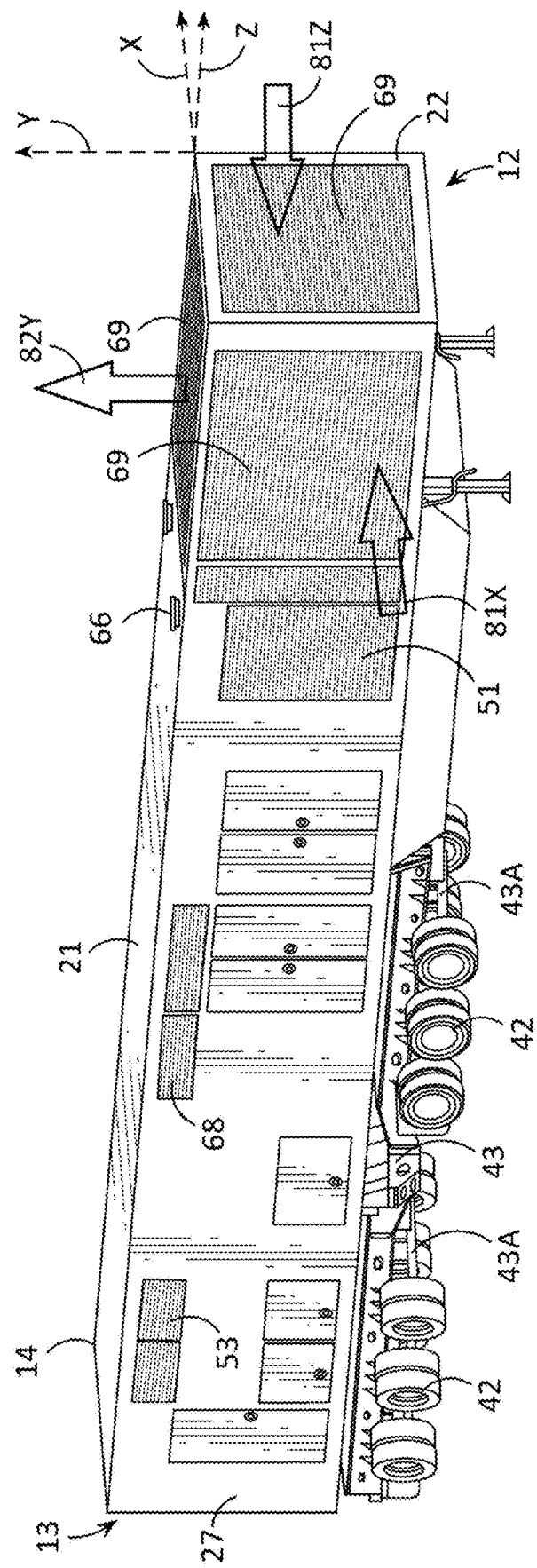
FIG. 5—FIG. 5 illustrates a top, rear perspective view of an example of a High Density Mobile Power Unit with an enclosure according to various embodiments described herein.
Figure 6:
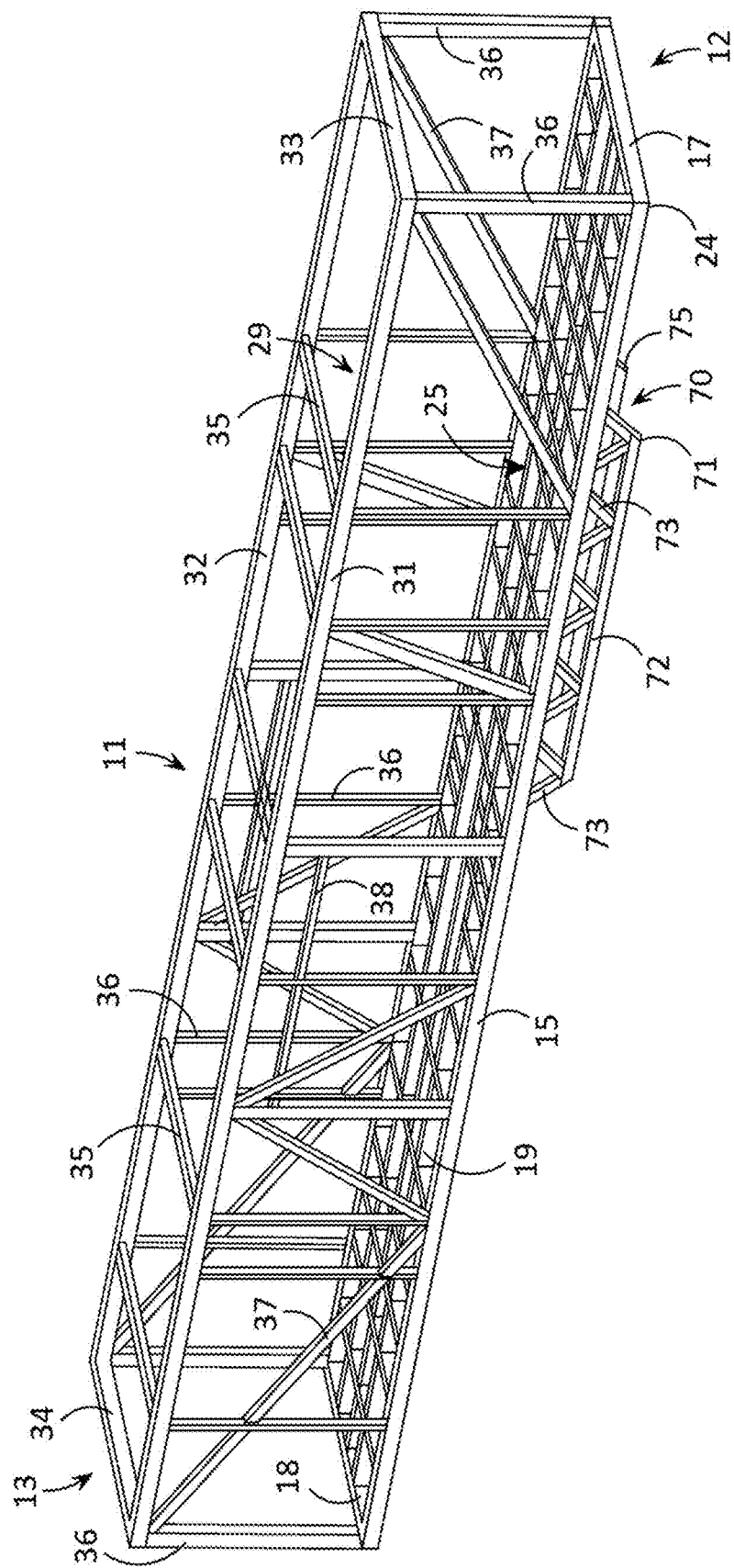
FIG. 6—FIG. 6 shows a top, front perspective view of an example of a High Density Mobile Power Unit with an enclosure according to various embodiments described herein.
Figure 7:
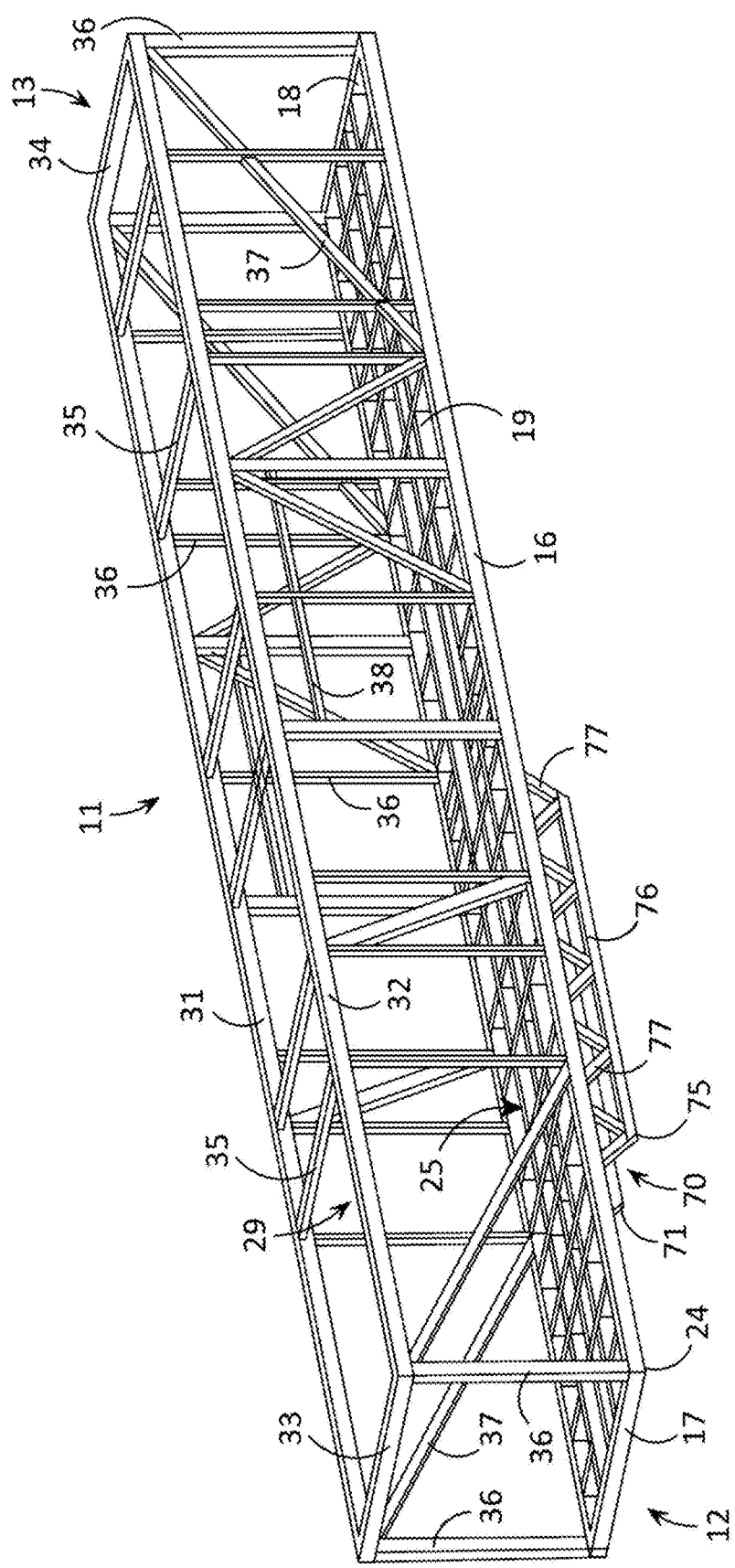
FIG. 7—FIG. 7 depicts a first side, top perspective view of an example of a unibody frame of a High Density Mobile Power Unit according to various embodiments described herein.
Figure 8:
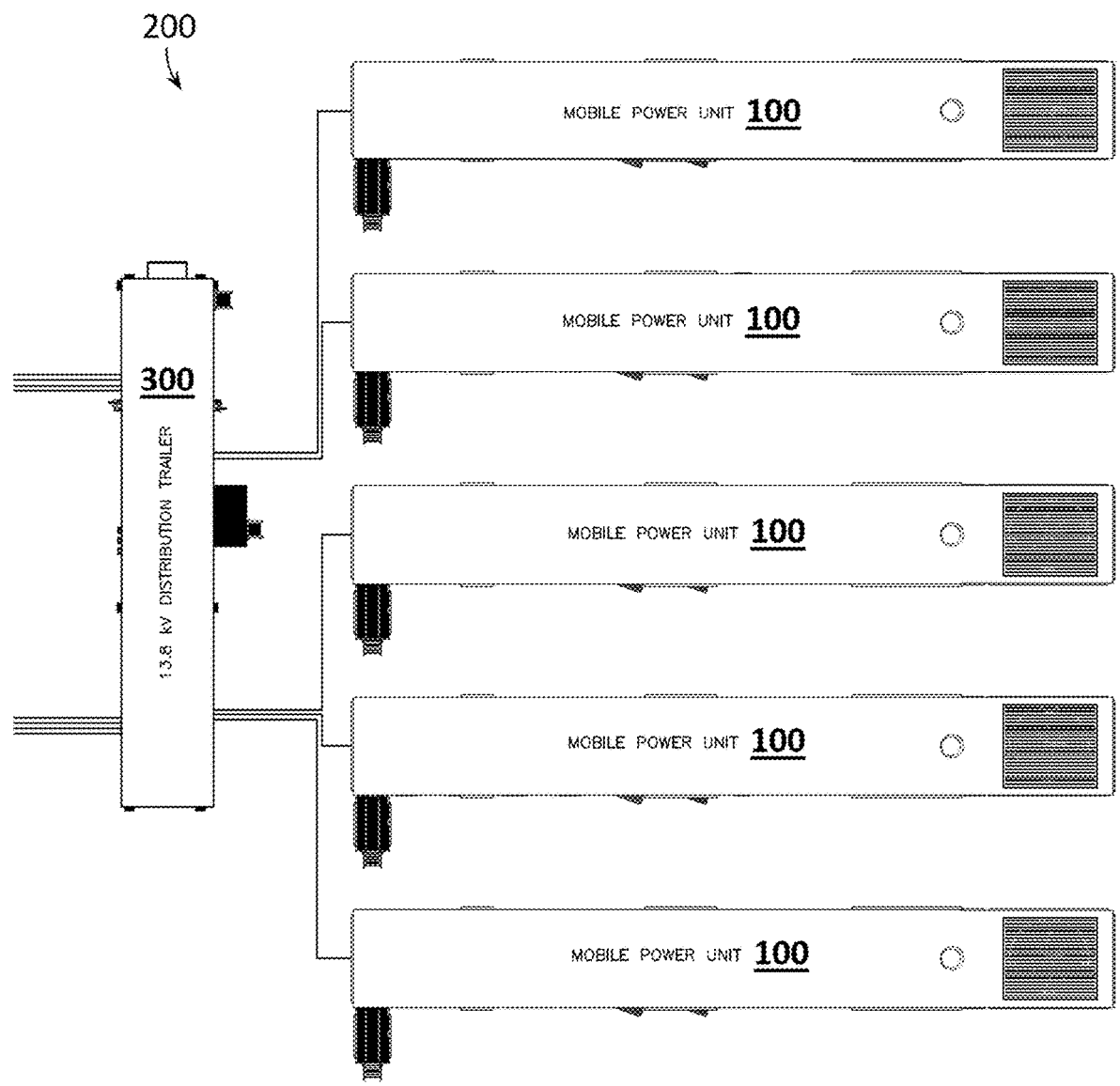
FIG. 8—FIG. 8 illustrates a second side, top perspective view of an example of a unibody frame of a High Density Mobile Power Unit according to various embodiments described herein.

In some embodiments, a four walls radiator 61 may comprise one or more fans 60 which may be axial flow fans. Axial-flow fans have blades that force air to move parallel to the shaft about which the blades rotate. In preferred embodiments, a four walls radiator 61 may comprise a plurality of electrical axial-flow type fans 60 which may be installed in the XZ plane (so that the blades rotate within a XZ plane relative to the X and Z axis) as shown in FIGS. 2, 3, and 5). In further embodiments, a fan 60 may include any type of rotating arrangement of vanes or blades capable of moving air, such as a rotary vane pump, a diaphragm pump, a piston pump, a scroll pump, a screw pump, a Wankel pump, an external vane pump, a roots blower or booster pump, a multistage roots pump, a blower fan, a vane pump, axial-flow fans, centrifugal fans, cross-flow fans, bellows, Coanda effect air movers, electrostatic air movers, or any other device or method capable of moving air.

In preferred embodiments, the MPU 100 may comprise a four walls radiator 61 that may be positioned in the front or rear of the frame cavity 29 so that the radiator 61 may have four cooling areas 61A that may be in communication with radiator exhaust and intake ports 69 of the enclosure 14, e.g., one on each side panel 27, 28, one on the roof panel 21, and one on the front panel 22. A liquid engine coolant may circulate through the engine block, and cylinder head of an engine 63 where it is heated, may then be passed through the radiator 61 where it loses heat to the atmosphere via cooling areas 61A and the radiator exhaust and intake ports 69 formed in the enclosure 14, and then returned to the engine 63. Engine coolant is usually water-based, glycol or a combination of both. It is common to employ a water pump to force the engine coolant to circulate, and also for one or more electric fans to force air through the radiator 61. In further embodiments, the radiator 61 of the cooling system may have one or more fans 60 which are operated by a hydraulic motor which may be part of a MPU 100 overall hydraulic system that may be also used for the operation of stabilization legs.

In some embodiments, a MPU 100 may comprise one or more enclosure air intakes 51 that may be configured to draw or otherwise enable air that is exterior to the enclosure 14 to enter the enclosure 14. Generally, an enclosure air intake 51 may enable relatively cooler air to enter the enclosure 14. Preferably, an enclosure air intake 51 may comprise a screen and/or filter which may prevent dirt, objects, and other contaminants from entering the enclosure 14 via the enclosure air intake 51. Optionally, an enclosure air intake 51 may include one or more axial-flow fans, centrifugal fans, cross-flow fans, bellows, Coanda effect air movers, electrostatic air movers, or any other device or method capable of moving air.

In some embodiments, a MPU 100 may comprise one or more enclosure exhausts 52 that may be configured to draw or otherwise enable air that is in the enclosure 14 to exit the enclosure 14. Generally, an enclosure exhaust 52 may enable relatively warmer air to exit the enclosure 14 so that it may be replaced with relatively cooler air supplied by an enclosure intake 51. Optionally, an enclosure exhaust 52 may include one or more axial-flow fans, centrifugal fans, cross-flow fans, bellows, Coanda effect air movers, electrostatic air movers, or any other device or method capable of moving air.

In some embodiments, a MPU 100 may comprise an enclosure ventilation which may extract air from the enclosure 14, which ingresses via the enclosure air intake 51, and may discharge the extracted air at the aft, upper part of the enclosure 14 via enclosure exhausts 52. Optionally, an enclosure ventilation may include one or more axial-flow fans, centrifugal fans, cross-flow fans, bellows, Coanda effect air movers, electrostatic air movers, or any other device or method capable of moving air.

In some embodiments, a MPU 100 may include a plurality of stabilizer legs that may be deployed while the generator units are in operation mode (when the engine(s) 63 and generator(s) 62 are generating electricity). In some embodiments, stabilizer legs may be configured similar to outriggers (sometimes called stabilizers as used in mobile crane trucks and the like) so as to comprise retractable hydraulic 'legs' that extend away from the MPU 100 before they make contact with the ground.

In preferred embodiments, a MPU 100 may comprise an engine 63 which may use natural gas, or hydrogen (or a mix of both as fuel), with a high-density power, preferably in a single trailer enclosure 14 using a reciprocating engine 63 of approximately 1,000 RPM to 2,000 RPM rated speed, such as 1,200 to 1,500 RPM rated speed. In further embodiments, the target power generated by the generator(s) 62 of the MPU 100 may be over 3.3 MW (gross power capacity). The gross rating or power capacity of an MPU 100 may be measured by the NOMINAL VALUE of the generator(s) 62 rating, burning pipeline quality Natural Gas below 3000 feet, at or below 100° F. The MPU 100 is preferably electrically efficient to at least between 40% to 45% energy efficient (measured using the bhp output of the engine without parasitic loads), which significantly reduces the fuel consumption and the amount of harmful emissions.

Preferably, a MPU 100 provides the flexibility to install a cooling radiator 61 in the front of the frame cavity 29 of the enclosure 14 or in the back of the trailer enclosure 14. In preferred embodiments, the power control section 20 and switchgear may be installed in the opposite side of frame cavity 29 where the radiator 61 is installed. Additionally, the MPU 100 requires low pressure for the fuel intake or fuel supply connection. The voltage generated by the MPU 100 may be selected by the user before the construction of the MPU 100, depending on the application, to any of the standard distribution voltages, such as below 13.8 KV.

The MPU 100 can be also be configured with the ability to work individually and for such it may have the generator(s) 62 connected to a Medium Voltage Switchgear insulated by SF6 (GIS) with at least one cable input, one feeder breaker to supply main power to the load, and one feeder or disconnector switch to feed an auxiliary transformer. This transformer may provide the required auxiliary power to the MPU 100.

Figure 9:
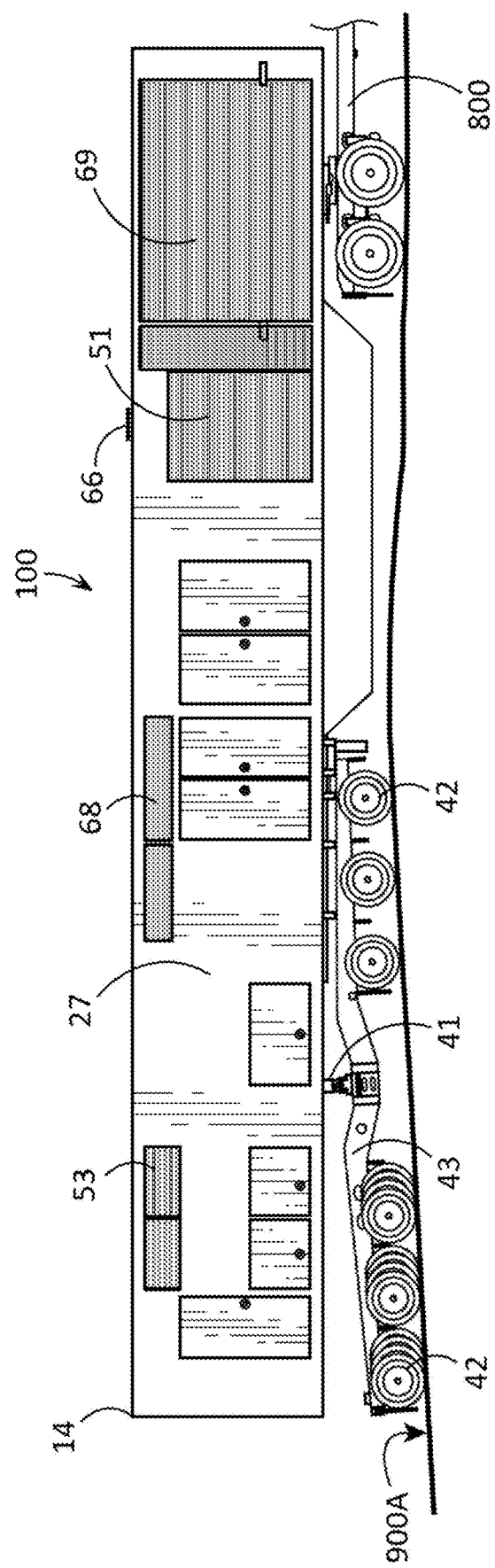
FIG. 9—FIG. 9 shows a side elevation view of another example of a High Density Mobile Power Unit with an enclosure that is substantially level on a ground surface having a road positive slope according to various embodiments described herein.
Figure 10:
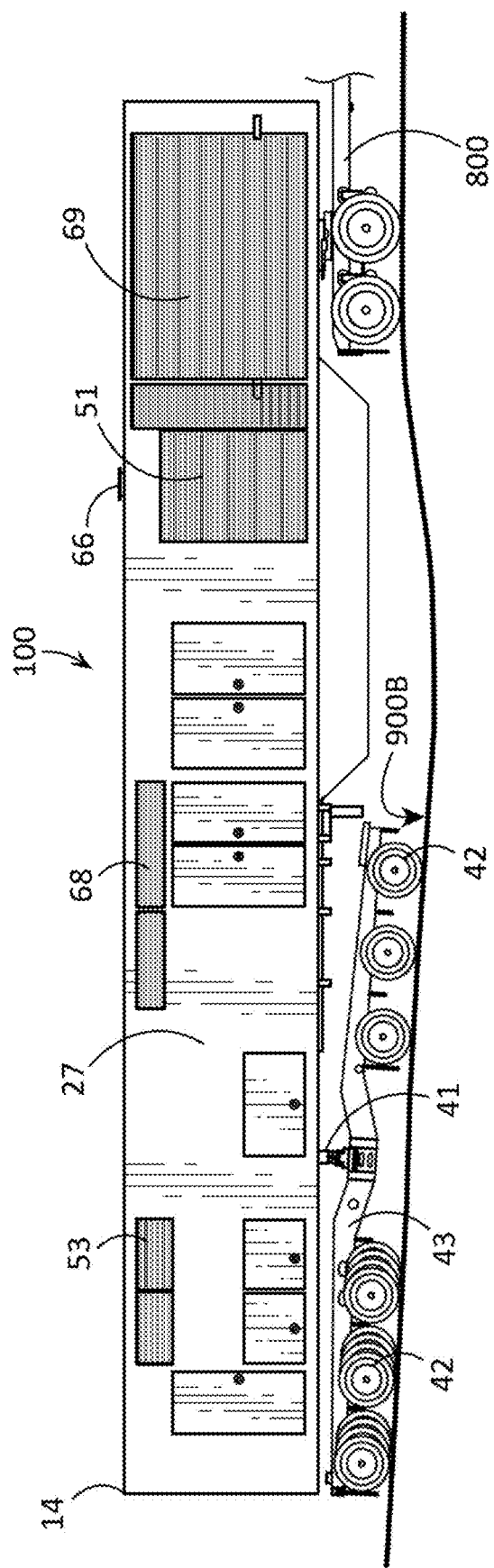
FIG. 10—FIG. 10 depicts a side elevation view of another example of a High Density Mobile Power Unit with an enclosure that is substantially level on a ground surface having a road positive slope according to various embodiments described herein.

Referring to FIG. 9 a mobile power system (MPS) 200 is disclosed herein which may include one or more High Density Mobile Power Units (MPUs) 100 and/or one or more Power Distribution Units (PDUs) 300. In some embodiments, the system 200 may include one or more power distribution units (PDUs) 300 that may be configured to operate as a power distribution station, preferably configured as a mobile and towable trailer that may be employed for transporting a Medium Voltage Switchgear, together with a Low Voltage Motor Control Center, monitor and control digital system, auxiliary power, and other auxiliary systems.

In some embodiments, and as shown in FIG. 9, a MPS 200 may include one or more, such as five, MPUs 100 and each one may be connected to or in electrical communication with a PDU 300. For example, a MPS 200 may include five MPUs 100 and each one may be generating 4.4 MW of power at a voltage of 13.8 kV. Preferably, each MPU 100 may be paralleled in a common switchgear, and as result the complete MPS 200 has a power equivalent or available power of 22 MW. In preferred embodiments, a PDU 300 has the ability to control each of the MPUs 100 of the MPS 200 and distribute the load equally among them. In preferred embodiments, a PDU 300 also has the required protection, relaying, and communication capabilities typical of a paralleling application, load protection devices and auxiliary systems.

While some exemplary shapes and sizes have been provided for elements of a MPU 100, MPS 200, and/or PDU 300, it should be understood to one of ordinary skill in the art that any element described herein may be configured in a plurality of sizes and shapes including "T" shaped, "X" shaped, square shaped, rectangular shaped, cylinder shaped, cuboid shaped, hexagonal prism shaped, triangular prism shaped, or any other geometric or non-geometric shape, including combinations of shapes. It is not intended herein to mention all the possible alternatives, equivalent forms or ramifications of the invention. It is understood that the terms and proposed shapes used herein are merely descriptive, rather than limiting, and that various changes, such as to size and shape, may be made without departing from the spirit or scope of the invention.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. A high density mobile power unit, the unit comprising:
an elongated unibody frame having a midpoint, a front end, a rear end, an elongated roof panel, a front panel, a rear panel, an elongated floor assembly having an upper side and a lower side, an elongated first side panel, and an elongated second side panel, wherein the elongated unibody frame provides dynamic and static rigidity to the mobile power unit;
an enclosure formed by the elongated roof panel, the front panel, the rear panel, the elongated floor assembly, the elongated first side panel, and the elongated second side panel, wherein elongated roof panel, the front panel, the rear panel, the elongated first side panel, and the elongated second side panel are coupled to the upper side of the floor assembly;
a frame cavity bounded by the enclosure, wherein the enclosure provides sound attenuation and environmental protection for elements positioned within the frame cavity; and
an under carriage structural lattice arrangement coupled to the lower side of the floor assembly from the midpoint and extending towards the front end, wherein the under carriage structural lattice arrangement comprises a first elongated lattice and a second elongated lattice, and wherein the first elongated lattice and second elongated lattice are substantially parallel to each other.

2. The unit of claim 1, wherein the first elongated lattice comprises a first elongated major brace and a plurality of first angled minor braces, wherein each first angled minor brace of the plurality of first angled minor braces is coupled to both the elongated floor assembly and the first elongated major brace, wherein the second elongated lattice comprises a second elongated major brace and a plurality of second angled minor braces, and wherein each second angled minor brace of the plurality of second angled minor braces is coupled to both the elongated floor assembly and the second elongated major brace.

3. The unit of claim 1, further comprising at least one wheel and tire assembly, wherein a distance between the elongated roof panel and a ground surface that the at least one wheel and tire assembly is in contact with is less than fourteen feet.

4. The unit of claim 1, further comprising a center pivoting multi-axle dolly coupled to the elongated unibody frame via a single dolly attachment point, wherein the center pivoting multi-axle dolly provides mobility of the unit on ground surfaces having road positive slope and on ground surfaces having road negative slope so that the elongated unibody frame and enclosure remain approximately level.

5. The unit of claim 4, having a height dimension of less than fourteen feet.

6. The unit of claim 1, further comprising a four walls radiator positioned within the enclosure, wherein the four walls radiator is configured to generate a first suctioning airflow in an X axis, a second suctioning airflow in a Z axis, and a discharging airflow in a Y axis.

7. The unit of claim 1, further comprising a generator positioned within the enclosure, wherein the generator is configured to produce at least 3.0 MW of electricity.

8. The unit of claim 7, further comprising an engine coupled to the generator with a speed reduction gearbox that is positioned between the generator and the engine, wherein the engine and the speed reduction gearbox are positioned within the enclosure, and wherein the engine is a reciprocating engine configured to operate between 1,000 RPM and 2,000 RPM.

9. The unit of claim 8, further comprising at least one low-profile engine exhaust silencer coupled to the engine and positioned within the frame cavity below the elongated roof panel, wherein the at least one low-profile engine exhaust silencer comprises an exhaust port that exits through the elongated roof panel.

10. The unit of claim 8, further comprising an air inlet plenum coupled to the engine and positioned within the enclosure.

11. The unit of claim 10, wherein the air inlet plenum comprises a first filtered air inlet intake port that is coupled to the elongated first side panel and, wherein the air inlet plenum comprises a second filtered air inlet intake port that is coupled to the elongated second side panel.

12. A high density mobile power unit, the unit comprising:
an elongated unibody frame having a midpoint, a front end, a rear end, an elongated roof panel, a front panel, a rear panel, an elongated floor assembly having an upper side and a lower side, an elongated first side panel, and an elongated second side panel, wherein the elongated unibody frame provides dynamic and static rigidity to the mobile power unit;
an enclosure formed by the elongated roof panel, the front panel, the rear panel, the elongated floor assembly, the elongated first side panel, and the elongated second side panel, wherein elongated roof panel, the front panel, the rear panel, the elongated first side panel, and the elongated second side panel are coupled to the upper side of the floor assembly;
a frame cavity bounded by the enclosure, wherein the enclosure provides sound attenuation and environmental protection for elements positioned within the frame cavity;
an under carriage structural lattice arrangement coupled to the lower side of the floor assembly from the midpoint and extending towards the front end, wherein the under carriage structural lattice arrangement comprises a first elongated lattice and a second elongated lattice, and wherein the first elongated lattice and second A elongated lattice are substantially parallel to each other;
a generator positioned within the enclosure; and
an engine coupled to the generator and positioned within the enclosure, wherein the generator is positioned between the engine and the rear end of the enclosure.

13. The unit of claim 12, wherein the first elongated lattice comprises a first elongated major brace and a plurality of first angled minor braces, wherein each first angled minor brace of the plurality of first angled minor braces is coupled to both the elongated floor assembly and the first elongated major brace, wherein the second elongated lattice comprises a second elongated major brace and a plurality of second angled minor braces, and wherein each second angled minor brace of the plurality of second angled minor braces is coupled to both the elongated floor assembly and the second elongated major brace.

14. The unit of claim 12, further comprising at least one wheel and tire assembly, wherein a distance between the elongated roof panel and a ground surface that the at least one wheel and tire assembly is in contact with is less than fourteen feet.

15. The unit of claim 12, further comprising a center pivoting multi-axle dolly coupled to the elongated unibody frame via a single dolly attachment point, wherein the multi-axle dolly has four axles, five axles, or six axles, wherein the center pivoting multi-axle dolly provides mobility of the unit on ground surfaces having road positive slope and on ground surfaces having road negative slope so that the elongated unibody frame and enclosure remain substantially level.

16. The unit of claim 15, having a height dimension of less than fourteen feet.

17. The unit of claim 12, further comprising a four walls radiator positioned within the enclosure, wherein the four walls radiator is configured to generate a first suctioning airflow in an X axis, a second suctioning airflow in a Z axis, and a discharging airflow in a Y axis.

18. The unit of claim 12, further comprising at least one low-profile engine exhaust silencer coupled to the engine and positioned within the frame cavity below the elongated roof panel, wherein the at least one low-profile engine exhaust silencer comprises an exhaust port that exits through the elongated roof panel.

19. The unit of claim 12, further comprising an air inlet plenum coupled to the engine and positioned within the enclosure.

20. The unit of claim 19, wherein the air inlet plenum comprises a first filtered air inlet intake port that is coupled to the elongated first side panel and, wherein the air inlet plenum comprises a second filtered air inlet intake port that is coupled to the elongated second side panel.

* * * * *